United States Patent
Middleton et al.

(10) Patent No.: US 10,069,568 B1
(45) Date of Patent: Sep. 4, 2018

(54) COMMUNICATIONS SYSTEM PROVIDING PHOTONIC CONVERSION AND POWER DETECTION AND RELATED METHODS

(71) Applicant: Harris Corporation, Melbourne, FL (US)

(72) Inventors: Charles F. Middleton, Rockledge, FL (US); John R. Desalvo, Satellite Beach, FL (US)

(73) Assignee: HARRIS CORPORATION, Melbourne, CA (US)

( * ) Notice: Subject to any disclaimer, the term of this patent is extended or adjusted under 35 U.S.C. 154(b) by 0 days.

(21) Appl. No.: 15/447,388

(22) Filed: Mar. 2, 2017

(51) Int. Cl.
H04B 10/00 (2013.01)
H04B 10/2575 (2013.01)
H04J 14/02 (2006.01)
H04B 10/50 (2013.01)

(52) U.S. Cl.
CPC ....... H04B 10/2575 (2013.01); H04B 10/503 (2013.01); H04J 14/02 (2013.01)

(58) Field of Classification Search
CPC ... H04J 14/02; H04B 10/548; H04B 10/2575; H04B 10/572; H04B 2210/006; H04B 10/07955
USPC .......................................................... 398/79
See application file for complete search history.

(56) References Cited

U.S. PATENT DOCUMENTS

| | | | |
|---|---|---|---|
| 6,433,531 B1 | 8/2002 | Regev | |
| 6,678,512 B1 | 1/2004 | Kaminski et al. | |
| 8,842,992 B2 | 9/2014 | Middleton et al. | |
| 9,709,668 B1* | 7/2017 | Kondratko | G01S 7/4811 |
| 9,825,698 B2* | 11/2017 | Heismann | H04B 10/07953 |
| 2013/0177315 A1* | 7/2013 | Middleton | H04J 14/02 398/79 |
| 2013/0177319 A1* | 7/2013 | Middleton | H01Q 3/2676 398/115 |
| 2013/0315597 A1* | 11/2013 | Shaver | H04J 14/0227 398/79 |

FOREIGN PATENT DOCUMENTS

WO 2016102678 6/2016

OTHER PUBLICATIONS

Wang et al. "Ultrahigh-Resolution Photonic-Assisted Microwave Frequency Identification Based on Temporal Channelization" IEEE Transactions on Microwave Theory and Techniques, vol. 61, No. 12, Dec. 2013, pp. 4275-4282.

(Continued)

*Primary Examiner* — Don N Vo
(74) *Attorney, Agent, or Firm* — Allen, Dyer, Doppelt + Gilchrist, P.A. Attorneys at Law

(57) ABSTRACT

A communications system may include an optical source configured to generate an optical carrier signal, a first electro-optic (EO) modulator coupled to the optical source and configured to modulate the optical carrier signal based upon a radio frequency (RF) input, and photonic mixers associated with different respective frequencies across a frequency spectrum and coupled to the optical source and the first EO modulator. The system may further include at least one first opto-electronic (OE) detector coupled to the photonic mixers, and an analog-to-digital converter (ADC) coupled to the at least one OE detector and configured to generate a digital output signal based upon receiving an RF signal via the RF input.

22 Claims, 5 Drawing Sheets

(56) References Cited

OTHER PUBLICATIONS

Toliver et al. "Photonics-based Spectral Folding and Selective Down-conversion of RF Signals" IEEE International Topical Meeting on Microwave Photonics, ThM1.5, Long Beach, California, Nov. 2016. pp. 69-72.

Zhang et al. "High-spectral-efficiency photonic frequency down-conversion using optical frequency comb and SSB modulation." IEEE Photonics Journal: vol. 5, No. 2; Apr. 2013, pp. 8.

Yang et al. "All-optical frequency down-conversion based on cross-phase modulation in high nonlinearity dispersion-shifted fiber for WDM radio over fiber application." Optica Applicata, vol. 39, No. 1: 2009; pp. 51-62.

Middleton et al. "An Adaptive, Agile, Reconfigurable Photonic System for Handling Analog Signals." Advanced Maui Optical and Space Surveillance Technologies Conference. vol. 1. 2014, pp. 8.

* cited by examiner

COMMUNICATIONS SYSTEM PROVIDING PHOTONIC CONVERSION AND POWER DETECTION AND RELATED METHODS

TECHNICAL FIELD

The present invention relates to the field of communications, and more particularly, to radio frequency (RF) communications and related methods.

BACKGROUND

By way of background, in some applications analog radio frequency (RF) systems need to rapidly identify signals over a wide frequency range in order to respond to those signals. For example, this may be important for object recognition in a radar (e.g., microwave) application, as well as to identify interfering signals across an operating frequency band for interference mitigation purposes. Depending on the particular application, various parameters which may be important in an RF signal identification configuration may include speed, accuracy, weight constraints, and cost.

One conventional approach to signal identification is called a folded receiver. A wideband antenna signal is divided N ways, and N RF tuners down-convert a section of the spectrum to a common intermediate frequency (IF), so that each section of the spectrum may be superimposed and monitored by a single analog-to-digital converter (ADC). The ambiguity of the frequency of a super-imposed signal is resolved by using an RF power meter after each tuner.

Such conventional RF signal identification approaches may suffer from certain drawbacks. One potential drawback is that the bandwidth of this type of system may be relatively limited by the analog RF components. Furthermore, the size, weight, and power (SWaP) of such devices may be prohibitive in certain applications.

Some Extremely High Frequency (EHF) communications systems (e.g., 30 to 300 GHz) use optical signal processing components to help address the bandwidth constraints of RF signal processing. An advantage of such systems is the ability to transmit EHF signals from a remote location without the degradation of the signal incumbent in RF applications.

One particularly advantageous approach is set forth in U.S. Pat. No. 8,842,992 to Middleton et al., which is assigned to the present Assignee and is hereby incorporated herein in its entirety by reference. Middleton et al. is directed to a communications device which includes a transmitter device having an optical source configured to generate an optical carrier signal, a first E/O modulator coupled to the optical source and configured to modulate the optical carrier signal with an input signal having a first frequency, and a second E/O modulator coupled to the optical source and configured to modulate the optical carrier signal with a reference signal. The communications device includes an optical waveguide coupled to the transmitter device, and a receiver device coupled to the optical waveguide and including an O/E converter coupled to the optical waveguide and configured to generate an output signal comprising a replica of the input signal at a second frequency based upon the reference signal.

Despite the advantages of such systems, further developments may be desirable in certain applications.

SUMMARY

A communications system may include an optical source configured to generate an optical carrier signal, a first electro-optic (EO) modulator coupled to the optical source and configured to modulate the optical carrier signal based upon a radio frequency (RF) input, and a plurality of photonic mixers each associated with a different respective frequency across a frequency spectrum and coupled to the optical source and the first EO modulator. The system may further include at least one first opto-electronic (OE) detector coupled to the plurality of photonic mixers, and an analog-to-digital converter (ADC) coupled to the at least one OE detector and configured to generate a digital output signal based upon receiving an RF signal via the RF input.

More particularly, in accordance with one example implementation each photonic mixer may include a first path coupled to the first EO modulator and comprising a first optical bandpass filter (BPF) and an optical power meter coupled to the first optical BPF, a second path coupled to the optical source and comprising an optoelectronic oscillator (OEO) and a second optical BPF coupled to the OEO, and an optical coupler coupled to the first and second paths. Moreover, the OEO may further include a second EO modulator coupled to the optical source, an optical splitter coupled to the second EQ modulator and providing an output to the second optical BPF, a second OE detector coupled to the optical splitter, and an RF BPF coupled to the second OE detector and providing a fixed local oscillator (LO) signal to the second EO modulator.

In accordance with an example embodiment, the system may also include a first wavelength division multiplexing (WDM) demultiplexer coupled between the first EO modulator and the plurality of photonic mixers, and a second WDM demultiplexer coupled between the optical source and the plurality of photonic mixers. Moreover, the system may also include at least one WDM combiner coupled to outputs of the plurality of photonic mixers. In accordance with another example implementation, the system may further include at least one intermediate frequency (IF) combiner coupled between the at least one first OE detector and the ADC in accordance with one example embodiment.

Additionally, in one example configuration the system may include a first optical splitter coupled between the first EO modulator and the plurality of photonic mixers, and a second optical splitter coupled between the optical source and the plurality of photonic mixers. Moreover, the system may also include at least one photonic lantern coupled to outputs of the plurality of photonic mixers.

By way of example, the optical source may include a plurality of laser sources, a wavelength division multiplexing (WDM) combiner configured to combine laser light from the plurality of laser sources, an optical amplifier coupled to the WDM combiner, and an optical splitter having an input coupled to the optical amplifier and a respective output coupled to the first EO modulator and to the plurality of photonic mixers. Also by way of example, the frequency spectrum may have a range between 100 MHz and 100 GHz.

A related communications method may include generating an optical carrier signal using an optical source, modulating the optical carrier signal using a first electro-optic (EO) modulator based upon a radio frequency (RF) input, and processing outputs of the optical source and the first EO modulator using a plurality of photonic mixers each associated with a different respective frequency across a frequency spectrum. The method may further include converting outputs of the plurality of photonic mixers to an RF signal using at least one first opto-electronic (OE) detector, and generating a digital output signal using an analog-todigital converter (ADC) coupled to the at least one OE detector based upon receiving an RF signal via the RF input.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation and multiple prime notation are used to indicate similar elements in different embodiments.

Figure 1:
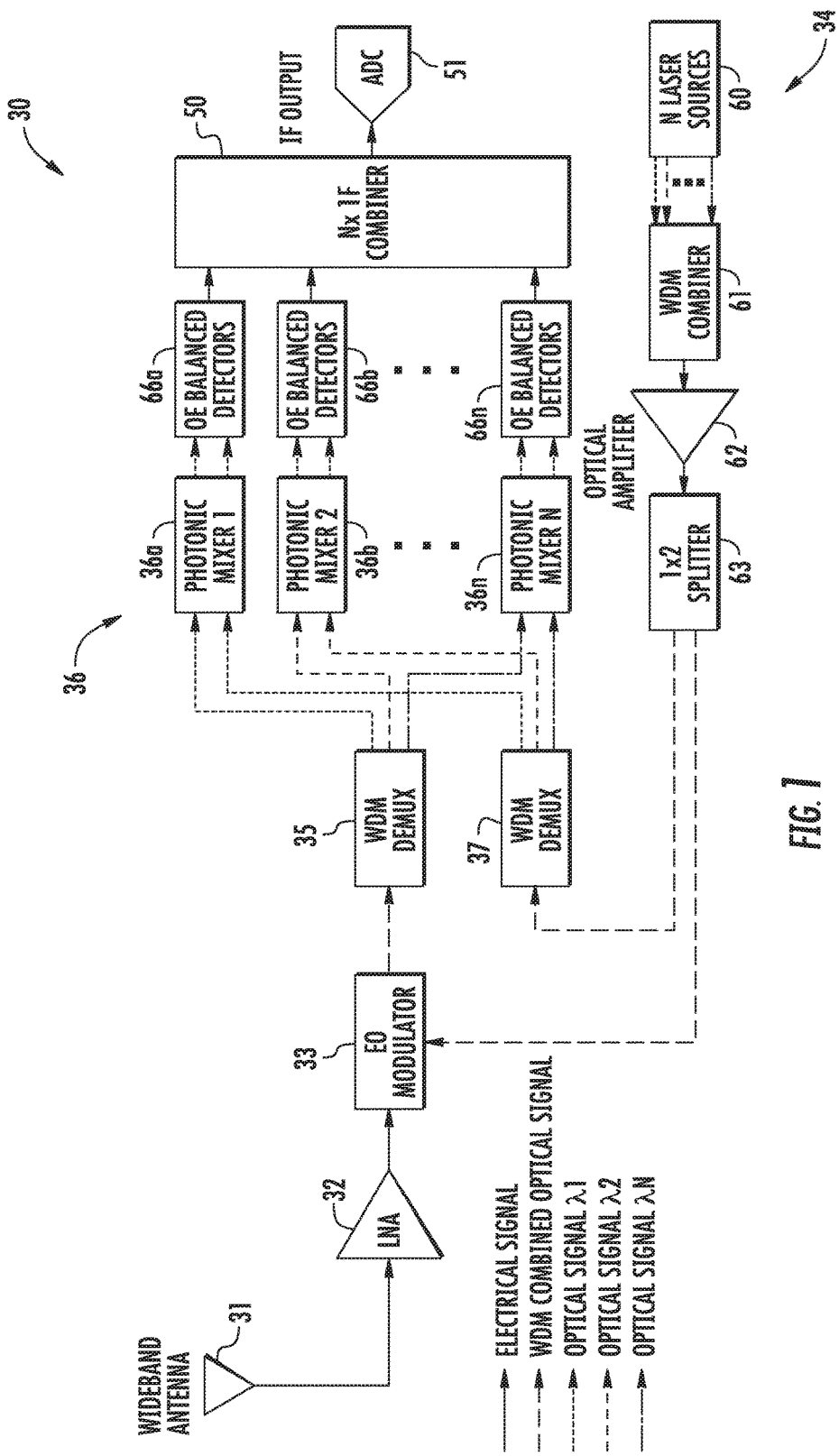
FIG. 1 is a schematic block diagram of a communications system including a receiver providing RF signal detection over a wideband operating range based upon optical signal processing in accordance with an example embodiment.
Figure 5:
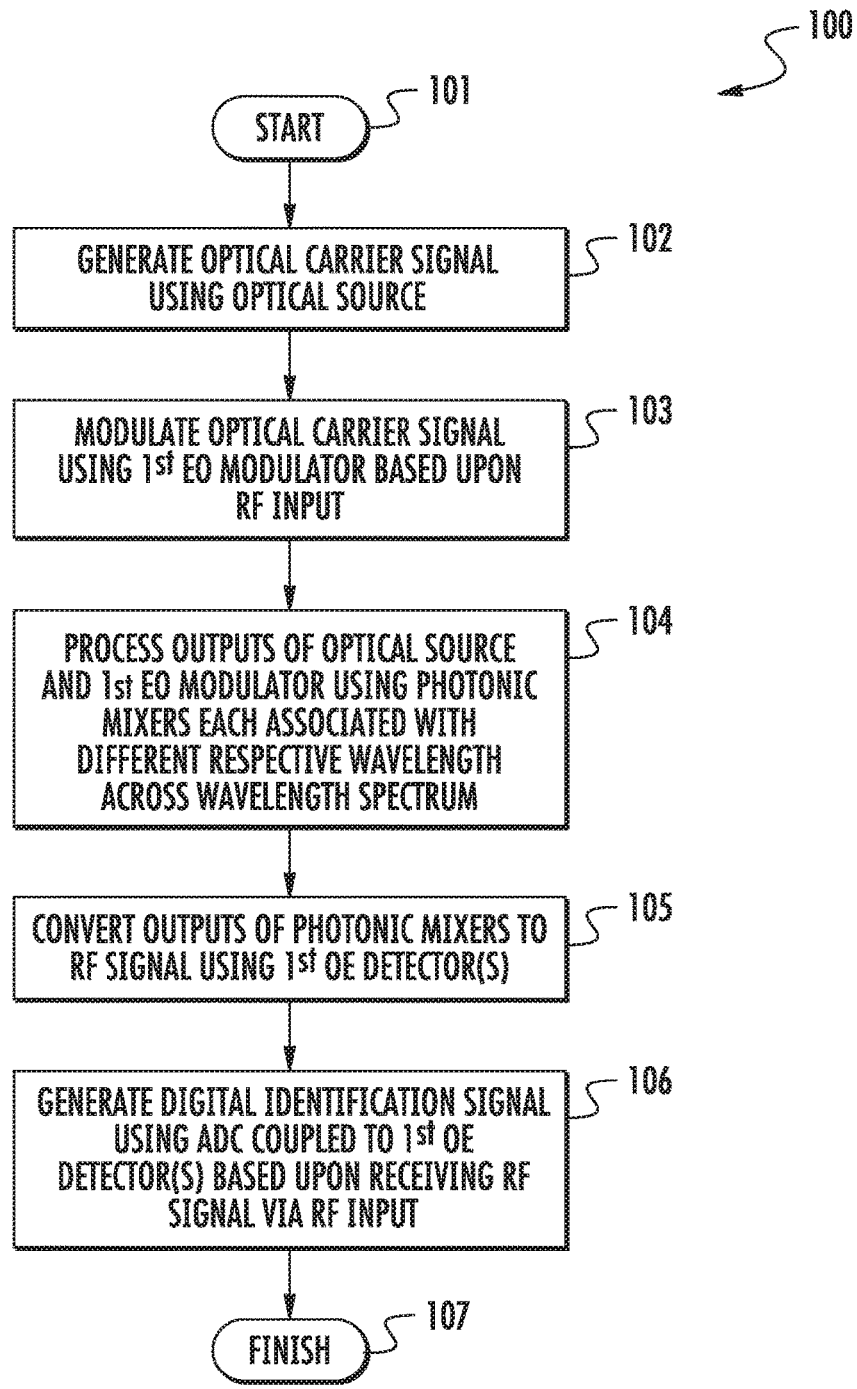
FIG. 5 is a flow diagram illustrating method aspects associated with the systems of FIGS. 1, 3, and 4.

Turning now to FIG. 1 and the flow diagram 100 of FIG. 5, a communications system 30 and associated method aspects are now described which may advantageously provide RF signal detection over a relatively wide spectrum (e.g., in a range between 10 GHz to 100 GHz) using photonic down-conversion. More particularly, the system 30 illustratively includes an RF antenna 31, such as a wideband RF antenna (including microwave and mm-wave antennas), which may be used to monitor a large portion of the RF frequency spectrum. Beginning at Block 101 of FIG. 5, signals received by the antenna 31 are amplified by an RF amplifier 32 (e.g., a low noise amplifier (LNA)), and are then modulated onto an optical carrier by a first electro-optic (EO) modulator 33 (Block 103). The optical carrier is generated by an optical source 34 and has N optical wavelengths (Block 102). Each optical wavelength receives a copy of the antenna 31 input spectrum at the first EO modulator 33.

A first wavelength-division multiplexing (WDM) demultiplexer 35 separates the optical wavelengths and distributes them to a plurality of N photonic mixers 36a-36n, at Block 104, which are generally referenced as photonic mixers 36 herein. Each photonic mixer 36a-36n receives two optical inputs, each of the same optical wavelength and from the same laser source 34. The first optical input has been modulated by the first EO modulator 33 based upon the antenna input spectrum, and the second optical input which has no modulation on it and is provided by a second WDM demultiplexer 37 coupled to the optical source 34. In the illustrated example, the optical source 34 includes a plurality of N laser sources 60 of different respective wavelengths across a frequency spectrum of interest (i.e., corresponding to the antenna 31 input spectrum), which are combined by a WDM combiner 61. An output of the WDM combiner 61 is provided to an optical amplifier 62 (e.g., an erbium-doped fiber amplifier (EDFA)), which is followed by a 1×2 optical splitter 63 which splits the output of the optical amplifier to the EO modulator 33 and the second WDM demultiplexer 37. By way of example, the splitter 63 may be a 50/50 optical splitter, although a different power splitting ratio may be used in different embodiments.

Figure 2:
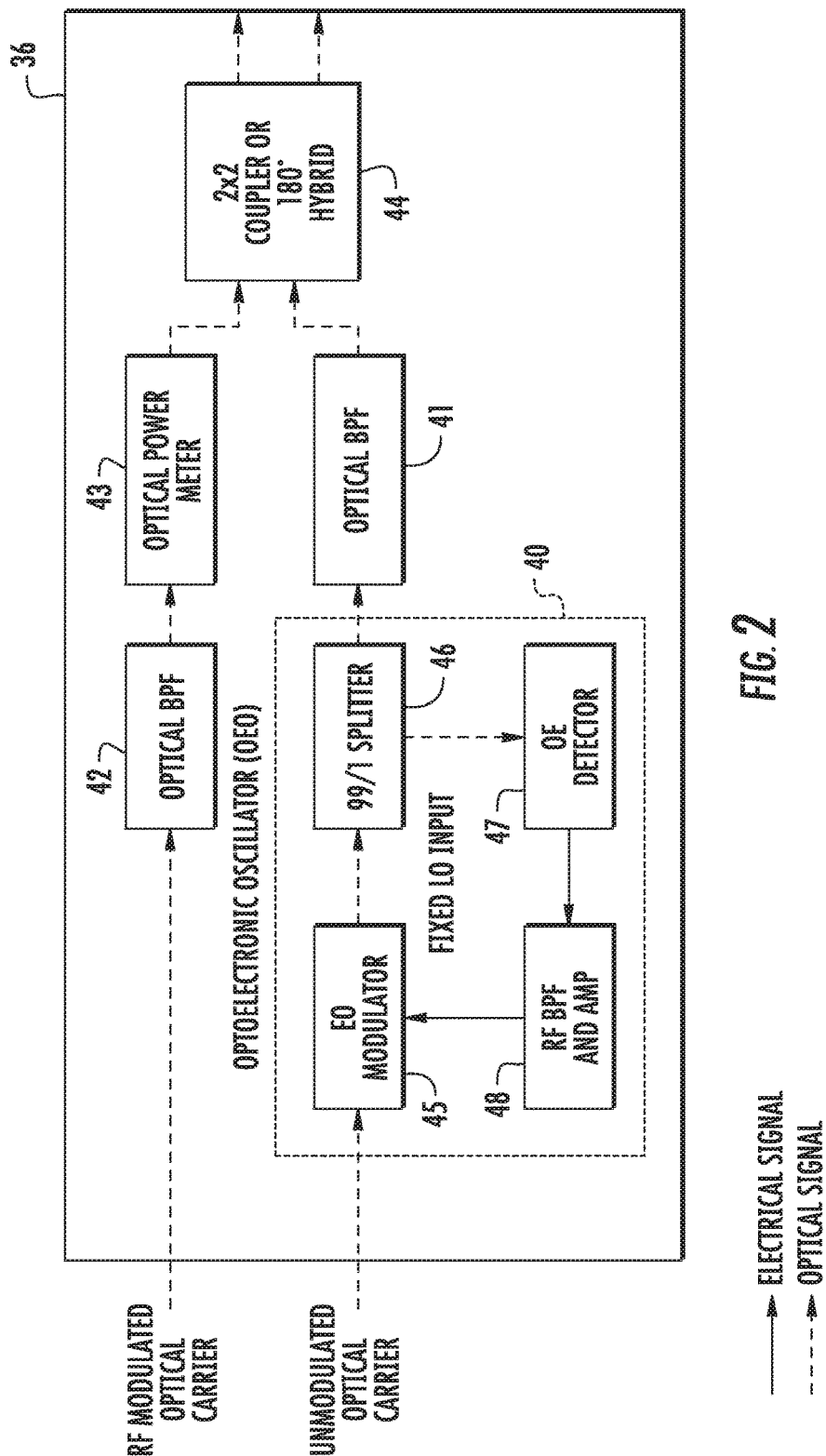
FIG. 2 is a schematic block diagram of a photonic mixer which may be used with the system of FIG. 1.

An example photonic mixer 36 configuration is shown in FIG. 2. The unmodulated optical carrier input goes through an optoelectronic oscillator (OEO) 40 to generate a low phase noise local oscillator (LO) optical sideband. However, it should be noted that in some embodiments the OEO 40 need not be used (e.g., there may instead by a direct insertion of an electronic LO signal from a signal generator). The LO optical sideband is sent through an optical bandpass filter (BPF) 41, which selects either the upper or lower optical sideband and suppresses the opposite sideband and optical carrier. The optically modulated input to each mixer goes through a tunable optical BPF 42 that is positioned to select the portion of the spectrum of interest, and it is followed by an optical power meter 43. A 2×2 optical coupler (or 180° optical hybrid) 44 combines the antenna and LO signals (i.e., the outputs from the optical power meter 43 and the optical BPF 41).

The OEO illustratively includes an EO modulator 45 coupled to the RF modulated optical signal, and an optical splitter 46 coupled to the EO modulator 45 and providing 99% of its output to the optical BPF 41. The other 1% of the optical output from the splitter 46 goes to an OE detector 47, and an RF BPF and associated amplifier 48 is coupled to the OE detector 47 to provide the fixed LO signal to the EO modulator 45. It should be noted that the splitter 46 may divide optical signal power by a different ratio than 99/1 in different embodiments, if desired.

Each mixer 36a-36n may be configured for down-conversion of a specific portion of the antenna input spectrum by adjusting the position of the optical BPF 42 and setting the frequency of the OEO 40 such that the entire antenna input spectrum may be divided into N segments, each of which is down-converted to the same IF. Respective OE balanced detectors 66a-66n are illustratively coupled to the outputs of the photonic mixers 36a-36n. An N×1 IF combiner 50 coupled to the OE balanced detectors 66a-66n brings all of these bandwidth sections together to generate the IF signal, at Block 105, and a single analog-to-digital converter (ADC) 51 digitizes all of the superimposed spectral content.

The ADC 51 accordingly generates a digital output signal based upon receiving an RF signal at any position within the antenna input spectrum via the RF input from the antenna 31, at Block 106, which illustratively concludes the method of FIG. 5 (Block 107). More particularly, an optical power measurement is made in each mixer 36 following the signal-side optical BPF 42 using an optical power meter 43 so that the presence of a signal may be identified and related to a specific mixer 36a-36n. Once the system 30 has been configured, the wavelengths, LO inputs and BPF positions may remain fixed; that is, no dynamic tuning is required.

By way of example, if the antenna 31 bandwidth is 2-18 GHz and the ADC has an instantaneous bandwidth (IBW) of 500 MHz at an IF center frequency of 1 GHz, N=32 lasers and mixers would be used to divide the 16 GHz of bandwidth into 500 MHz sections. The OEOs 40 and filters 41, 42 in the mixers 36 would be configured to down-convert 500 MHz bandwidth sections to the common 1 GHz IF, and the ADC would simultaneously monitor all 32 channels. The first photonic mixer 36a would use the optical BPFs 41, 42 to select the frequencies from 2-2.5 GHz, and the OEO 40 would be configured to provide an LO of either 1.25 GHz (low-side LO) or 3.25 GHz (high-side LO). The second photonic mixer 36*b* would use the optical BPFs 41, 42 to select frequencies from 2.5-3 GHz, and the OEO 40 would be configured to provide an LO of either 1.75 GHz (low-side LO) or 3.75 GHz (high-side LO). The Nth photonic mixer 36*n* (here N is 32) would use the optical BPFs 41, 42 to select frequencies from 17.5-18 GHz and the OEO 40 would be configured to provide an LO of either 16.75 GHz (low-side LO) or 18.75 GHz (high-side LO). If the ADC 51 observes a signal at 1.05 GHz and the optical power measurement from the 31$^{st}$ photonic mixer indicates that the signal passed through the optical BPF 42, the signal frequency can be immediately identified as 17.3 GHz.

From an implementation standpoint, the EO modulator 33 that immediately follows the wideband antenna 31 and LNA 32 in the system 30 may be located very close to the antenna aperture, and optical fiber may be used to send the optically modulated signal to the remotely located ADC 51. The remaining optical components, including the laser sources, WDM combiners, and photonic tuners, can be implemented using photonic integrated circuits for optimal size and weight reduction.

The system 30 accordingly advantageously provides access to wider bandwidth than is possible with conventional RF folded receiver configurations. In accordance with one example implementation, at least 70 GHz of RF spectrum may be continuously monitored using a single ADC and commercial off-the-shelf (COTS) photonic components. The system 30 may also advantageously help avoid RF component losses for high frequencies, as would be the case where all of the filtering is performed in the RF domain. Further, the system 30 may provide relatively low latency due to the photonic analog down-conversion. Another advantage of the system 30 is a relatively high spurious-free dynamic range (SFDR) photonic down-conversion, which allows for the use of a high effective number of bits (ENOB) ADC for high spectral resolution. Still another advantage is a significant reduction in size, weight, and power (SWaP), as only a single modulator need be used at the antenna 31, in addition to the savings provided by the photonic integration for mixers, lasers and WDM components, as will be appreciated by those skilled in the art. A particularly beneficial use for the system 30 is for interference mitigation applications in congested environments, for example.

Figure 3:
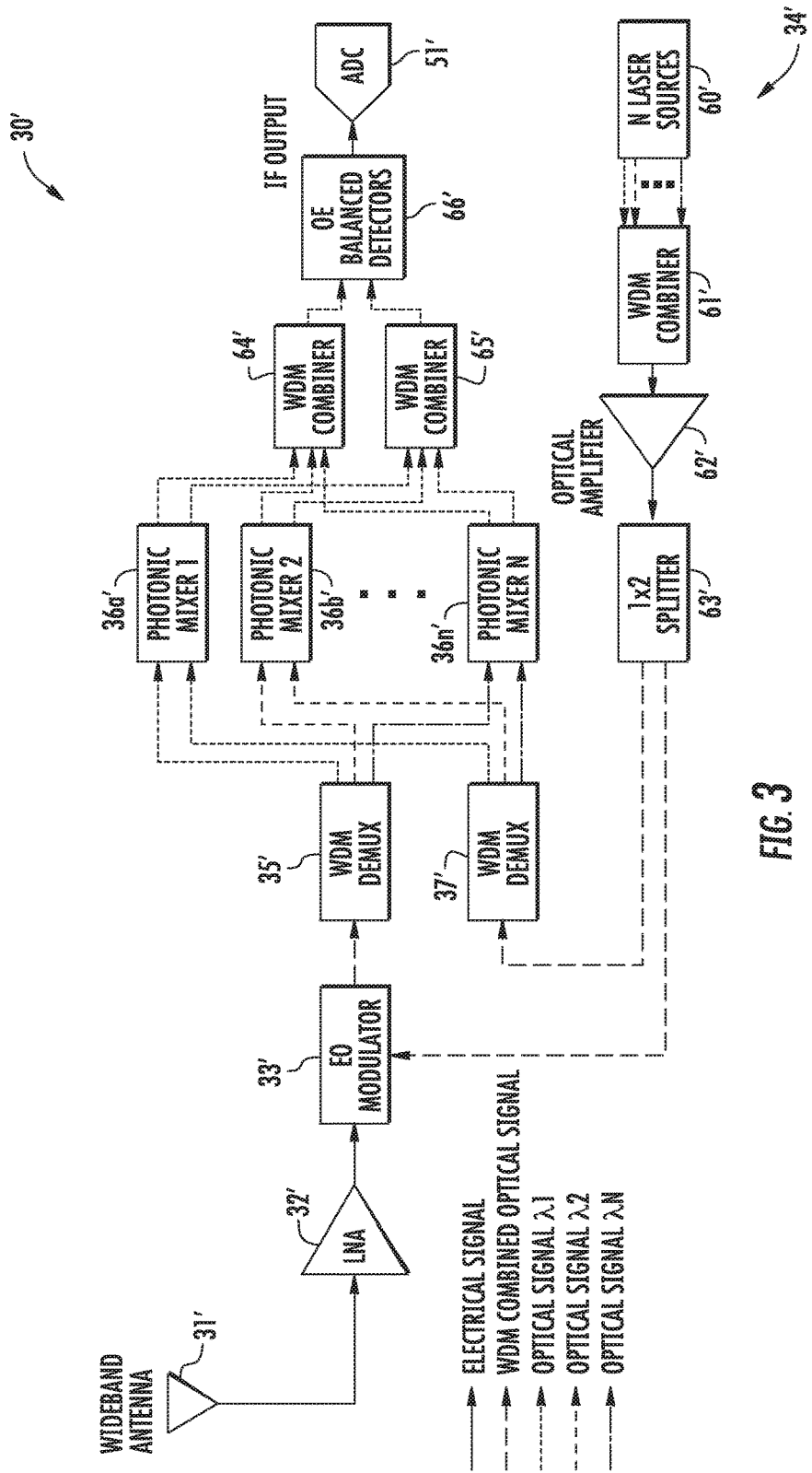
FIG. 3 is a schematic block diagram of another communications system similar to that of FIG. 1 in accordance with an example embodiment.

Turning to FIG. 3, another example implementation of the system 30' is now described which is similar to the system 30, but with a different approach for generating the IF output. More particularly, in the illustrated embodiment first and second WDM combiners 64', 65' are coupled to the outputs of the photonic mixers 36*a*'-36*n*', followed by OE balanced detectors 66' which produce the IF output for the ADC 51'. This configuration may not only enjoy the above-described advantages of the system 30, but it may also be desirable for applications such as spectrum surveying and WDM radio-over-fiber, for example.

Figure 4:
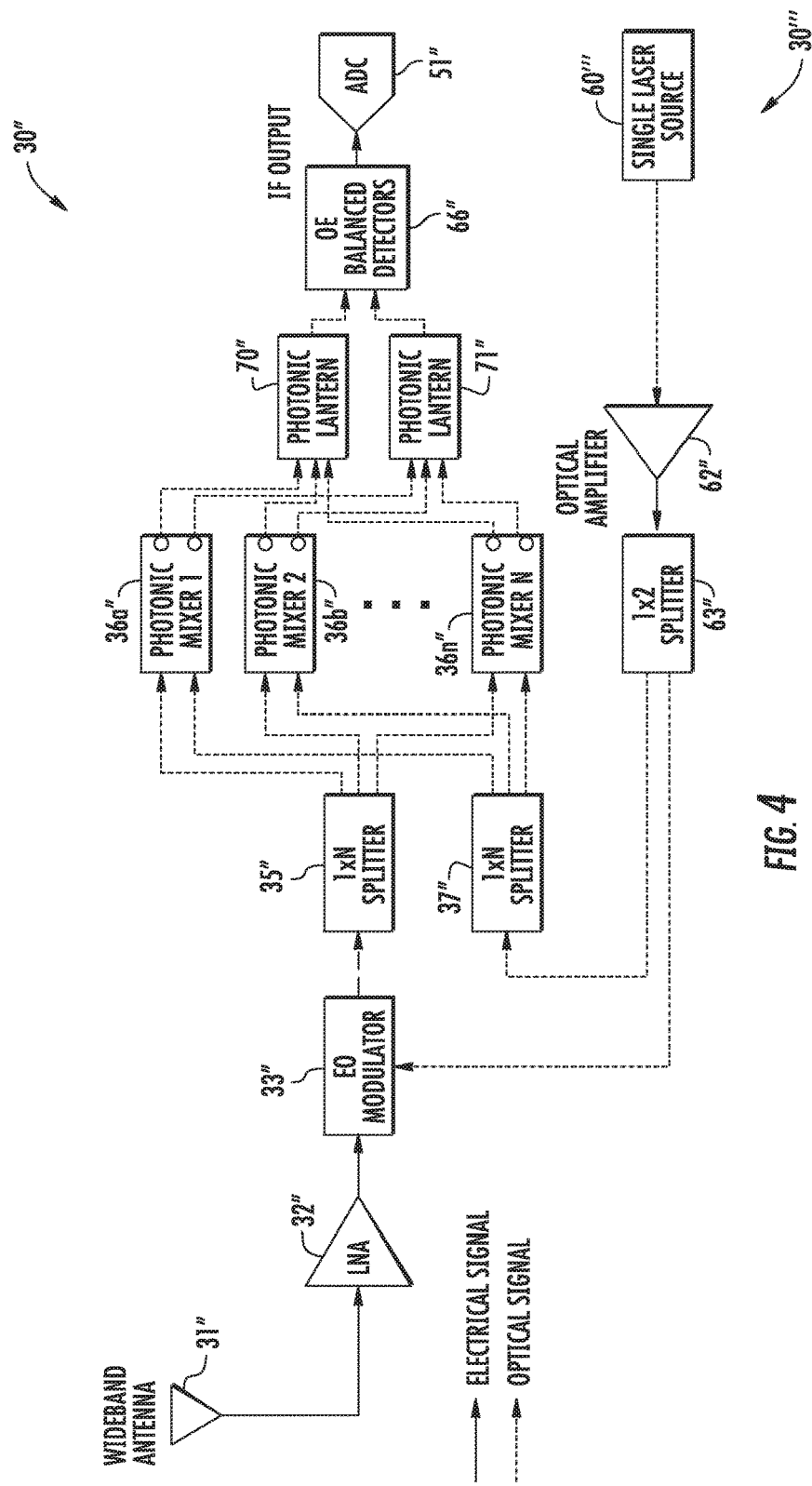
FIG. 4 is a schematic block diagram of still another communications system similar to that of FIG. 1 in accordance with an example embodiment.

Referring to FIG. 4, in accordance with another example embodiment of the system 30", a single laser source 60" may be used, along with photonic lanterns 70", 71" (or other suitable mode-combining devices) which bring the N optical signals together without the need for an N×1 combiner as discussed above, and the associated 20logN insertion loss. More particularly, the photonic lanterns 70", 71" combine all of the IF signals onto a single pair of balanced OE detectors 66", which produces the IF output, and the ADC 51" digitizes all of the superimposed spectral content, as described above.

The photonic lanterns 70", 71" (or other suitable mode-combining devices) take the signals from each of N inputs and place them directly onto a single multi-mode or few-mode fiber by transitioning the signals from single-mode fiber into different propagating modes in the multi-mode or few-mode fiber. When the signals reach the OE detectors 66", they are each detected and coherently combined through the bandgap transition in the photodiode. Care may be taken in assembling the modes so that they do not interact with one another over the relatively short distance from the photonic lantern to the photodiode, as will be appreciated by those skilled in the art. While this configuration shares the above-described benefits of the systems 30, 30', it has an additional advantage of fewer components.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A communications system comprising:
an optical source configured to generate an optical carrier signal;
a first electro-optic (EO) modulator coupled to the optical source and configured to modulate the optical carrier signal based upon a radio frequency (RF) input;
a plurality of photonic mixers each associated with a different respective frequency from among a plurality of different frequencies across a frequency spectrum and coupled to the optical source and the first EO modulator;
at least one first opto-electronic (OE) detector coupled to the plurality of photonic mixers; and
a common analog-to-digital converter (ADC) coupled to the at least one OE detector and configured to generate a digital output signal based upon the plurality of different frequencies across the frequency spectrum.

2. The communications system of claim 1 wherein each photonic mixer comprises:
a first path coupled to the first EO modulator and comprising a first optical bandpass filter (BPF) and an optical power meter coupled to the first optical BPF;
a second path coupled to the optical source and comprising an optoelectronic oscillator (OEO) and a second optical BPF coupled to the OEO; and
an optical coupler coupled to the first and second paths.

3. The communications system of claim 2 wherein the OEO further comprises:
a second EO modulator coupled to the optical source;
an optical splitter coupled to the second EO modulator and providing an output to the second optical BPF;
a second OE detector coupled to the optical splitter; and
an RF BPF coupled to the second OE detector and providing a fixed local oscillator (LO) signal to the second EO modulator.

4. The communications system of claim 1 further comprising:
a first wavelength division multiplexing (WDM) demultiplexer coupled between the first EO modulator and the plurality of photonic mixers; and a second WDM demultiplexer coupled between the optical source and the plurality of photonic mixers.

5. The communications system of claim 4 further comprising at least one WDM combiner coupled to outputs of the plurality of photonic mixers.

6. The communications system of claim 4 further comprising at least one intermediate frequency (IF) combiner coupled between the at least one first OE detector and the ADC.

7. The communications system of claim 6 further comprising at least one photonic lantern coupled to outputs of the plurality of photonic mixers.

8. The communications system of claim 1 further comprising:
a first optical splitter coupled between the first EO modulator and the plurality of photonic mixers; and
a second optical splitter coupled between the optical source and the plurality of photonic mixers.

9. The communications system of claim 1 wherein the optical source comprises:
a plurality of laser sources;
a wavelength division multiplexing (WDM) combiner configured to combine laser light from the plurality of laser sources;
an optical amplifier coupled to the WDM combiner; and
an optical splitter having an input coupled to the optical amplifier, and a respective output coupled to the first EO modulator and to the plurality of photonic mixers.

10. The communications system of claim 1 wherein the frequency spectrum has a range between 100 MHz and 100 GHz.

11. A communications system comprising:
an optical source configured to generate an optical carrier signal;
a first electro-optic (EO) modulator coupled to the optical source and configured to modulate the optical carrier signal based upon a radio frequency (RF) input;
a first wavelength division multiplexing (WDM) demultiplexer coupled to the first EO modulator;
a second WDM demultiplexer coupled to the optical source;
a plurality of photonic mixers each associated with a different respective frequency across a frequency spectrum and coupled to the first and second WDM demultiplexers, each photonic mixer comprising
a first path coupled to the first EO modulator and comprising a first optical bandpass filter (BPF) and an optical power meter coupled to the first optical BPF,
a second path coupled to the optical source and comprising an optoelectronic oscillator (OEO) and a second optical BPF coupled to the OEO, and
an optical coupler coupled to the first and second paths;
at least one first opto-electronic (OE) detector coupled to the plurality of photonic mixers; and
an analog-to-digital converter (ADC) coupled to the at least one OE detector and configured to generate a digital output signal based upon receiving an RF signal via the RF input.

12. The communications system of claim 11 wherein the OEO further comprises:
a second EO modulator coupled to the optical source;
an optical splitter coupled to the second EO modulator and providing an output to the second optical BPF;
a second OE detector coupled to the optical splitter; and
an RF BPF coupled to the second OE detector and providing a fixed local oscillator (LO) signal to the second EO modulator.

13. The communications system of claim 11 further comprising at least one WDM combiner coupled to outputs of the plurality of photonic mixers.

14. The communications system of claim 11 further comprising at least one intermediate frequency (IF) combiner coupled between the at least one first OE detector and the ADC.

15. The communications system of claim 11 wherein the optical source comprises:
a plurality of laser sources;
a wavelength division multiplexing (WDM) combiner configured to combine laser light from the plurality of laser sources;
an optical amplifier coupled to the WDM combiner; and
an optical splitter having an input coupled to the optical amplifier, and a respective output coupled to the first EO modulator and to the plurality of photonic mixers.

16. A communications method comprising:
generating an optical carrier signal using an optical source;
modulating the optical carrier signal using a first electro-optic (EO) modulator based upon a radio frequency (RF) input;
processing outputs of the optical source and the first EO modulator using a plurality of photonic mixers each associated with a different respective frequency from among a plurality of different frequencies across a frequency spectrum;
converting outputs of the plurality of photonic mixers to an RF signal using at least one first opto-electronic (OE) detector; and
generating a digital output signal using a common analog-to-digital converter (ADC) coupled to the at least one OE detector based upon the plurality of different frequencies across the frequency spectrum.

17. The method of claim 16 wherein each photonic mixer comprises:
a first path coupled to the first EO modulator and comprising a first optical bandpass filter (BPF) and an optical power meter coupled to the first optical BPF;
a second path coupled to the optical source and comprising an optoelectronic oscillator (OEO) and a second optical BPF coupled to the OEO; and
an optical coupler coupled to the first and second paths.

18. The method of claim 17 wherein the OEO further comprises:
a second EO modulator coupled to the optical source;
an optical splitter coupled to the second EO modulator and providing an output to the second optical BPF;
a second OE detector coupled to the optical splitter; and
an RF BPF coupled to the second OE detector and providing a fixed local oscillator (LO) signal to the second EO modulator.

19. The method of claim 16 further comprising:
demultiplexing an output of the first EO modulator using a first wavelength division multiplexing (WDM) coupled to the plurality of photonic mixers; and
demultiplexing the optical source using a second WDM demultiplexer coupled to the plurality of photonic mixers.

20. The method of claim 19 further comprising combining outputs of the plurality of photonic mixers using at least one WDM combiner.

21. The method of claim 19 further comprising combining outputs of the plurality of photonic mixers using at least one intermediate frequency (IF) combiner coupled between the at least one first OE detector and the ADC.

22. The method of claim 16 further comprising:
   splitting an output of the first EO modulator using a first optical splitter coupled to the plurality of photonic mixers; and
   splitting the optical signal using a second optical splitter coupled to the plurality of photonic mixers.

* * * * *